UNITED STATES PATENT OFFICE.

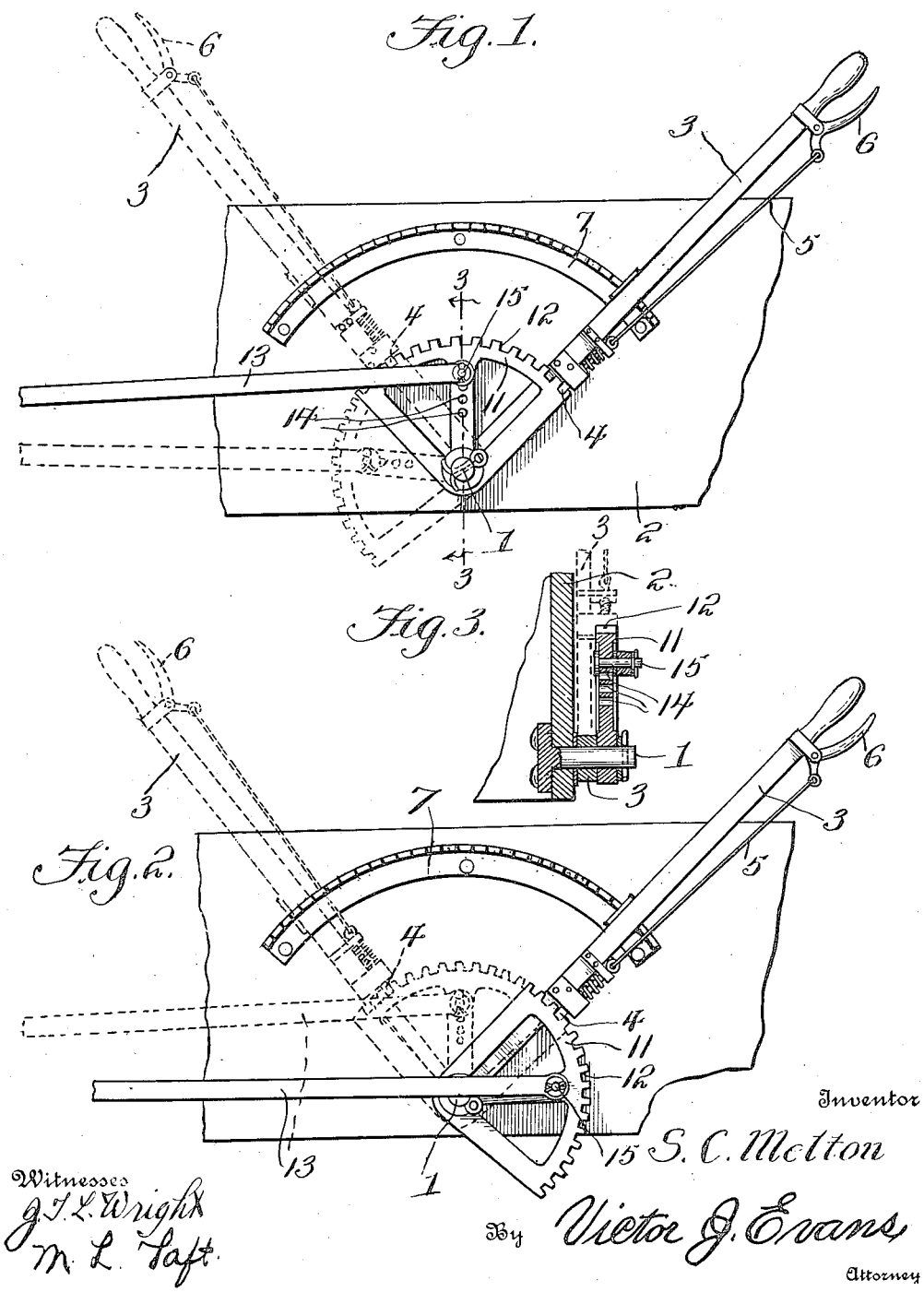
S. C. MELTON.
BRAKE OPERATING MECHANISM.
APPLICATION FILED SEPT. 4, 1915.
1,176,077.
Patented Mar. 21, 1916.

SHELBY C. MELTON, OF CHARLESTON, WEST VIRGINIA.

BRAKE-OPERATING MECHANISM.

1,176,077.

Specification of Letters Patent.   Patented Mar. 21, 1916.

Application filed September 4, 1915.   Serial No. 49,074.

*To all whom it may concern:*

Be it known that I, SHELBY C. MELTON, a citizen of the United States, residing at Charleston, in the county of Kanawha and State of West Virginia, have invented new and useful Improvements in Brake-Operating Mechanism, of which the following is a specification.

This invention relates to brake operating mechanism and it consists in the novel features hereinafter described and claimed.

An object of the invention is to provide simple and efficient means for adjustably connecting the operating lever of a wagon brake structure with the beam actuating rod thereof.

Frequently it occurs when a wagon brake, as now generally used, is adjusted with relation to the wheels of the running gear to obtain a desired leverage or power at the operating lever, the shoes of the brake cannot be moved far enough away from the peripheries of the wheels to escape the mud which is collected, consequently this mud is carried up and accumulates upon the shoes of the brake, and adds materially to the friction and results in hard running of the vehicle. It also happens when the shoes wear that it is necessary to adjust the operating rod upon the lever to properly position the shoes with relation to the wheels, so that the shoes may be applied to the wheels as a result of the swinging movement of the lever. The present invention overcomes these objectionable features in that a connecting means is provided between the lever and the operating rod for adjustably connecting the rod with the lever to impart to the rod a desired extent of movement, as a result of one or more swinging movements of the lever.

In the accompanying drawing:—Figure 1 is a side elevation of the adjustable wagon brake showing the parts in one position. Fig. 2 is a similar view showing the parts in another position, Fig. 3 is a transverse sectional view of the brake cut on the line 3—3 of Fig. 1.

The device includes a stud 1 which is fixed to the side of a wagon bed 2 in any suitable manner. A lever 3 is pivoted upon the stud 1 and carries a spring pressed pawl 4. A rod 5 is connected at one end with the pawl 4 and at its other end with a grip lever 6 pivoted upon the lever 3 in the vicinity of the free end thereof. A dentate segment 7 is mounted at the side of the bed 2 and is engaged by the lever 3 whereby the lever is held at an adjusted position.

A segment 11 is loosely mounted upon the stud 1 adjacent the side of the lever 3 and the segment 11 is provided at its upper edge with a series of notches 12, in any one of which the pawl 4 may engage.

A brake operating rod 13 is pivotally connected at one end with the segment 11 and at its other end with a brake beam in the usual manner. The segment 11 is provided with a series of perforations 14, any one of which may receive a pin 15, whereby the rod 13 may be connected with the segment 11 at a desired distance from the stud 1. The rod 13 is connected with the segment 11 at the opposite side thereof from that side which is adjacent the lever 3.

Under ordinary conditions the pawl 4 upon the lever 3 is engaged with one of the notches 12 of the segment 11, whereby a desired movement is imparted to the rod 3 as a result of one swinging movement of the lever 3. If, however, the shoes which are carried by the brake beam should wear and it is desired to increase the movement of the rod 13, the lever 3 is given one swinging movement which may bring the brake shoes close to the periphery of the wheel, and then the grip lever 6 is manipulated, whereby the rod 5 is moved longitudinally and the pawl 4 is disengaged from that notch in which it has been seated. The lever 3 is then swung in a backward direction and the pawl 4 is permitted to engage in another notch 12 nearer the left hand edge of the segment 11. After the pawl 4 is so engaged with the notch of the segment 11, a second swinging movement may be imparted to the lever 3 in a forward direction and this will move the rod 13 still farther in a forward direction and cause the brake beam to move forward and bring the shoes in contact with the peripheries of the wheels. Also the extent of movement of the rod 13 may be regulated by adjusting the forward end of the rod toward or away from the stud 1 by positioning the pin 15 in any desired one of the perforations 14.

From the above description taken in conjunction with the accompanying drawing it will be seen that simple and efficient means is provided for adjustably connecting the brake operating rod of a brake mechanism with the lever thereof, and that the parts may be easily and quickly manipulated for imparting to the brake operating rod movement of sufficient extent to cause the brake shoes to properly engage the peripheries of the wheels of the running gear.

Having described the invention what is claimed is:—

In combination with a brake operating rod, a segment pivotally mounted and connected with the rod, a lever pivoted at the pivot of the segment for movement independent of the segment and means carried by the lever for engaging the segment at the different points.

In testimony whereof I affix my signature in presence of two witnesses.

SHELBY C. MELTON.

Witnesses:
W. B. TAYLOR,
G. W. KRAPP.